INVENTOR.
Masaharu Kubokawa
BY: Kelman and Berman
AGENTS.

United States Patent Office 3,619,890
Patented Nov. 16, 1971

3,619,890
PLIERS FOR STOP RINGS
Masaharu Kubokawa, 3–11–8 Minaminagasaki,
Toshima-ku, Tokyo, Japan
Filed Mar. 4, 1970, Ser. No. 16,401
Claims priority, application Japan, Nov. 11, 1969,
44/90,640
Int. Cl. B25b; B23p 19/04
U.S. Cl. 29—229                          7 Claims

ABSTRACT OF THE DISCLOSURE

Pliers for stop rings having two handles pivotally connected to each other, and two blade supporting members each having a blade mounted thereon. The blade supporting members are pivotally connected and may each be coupled to either handle. When the two handles are moved toward each other, the blades are moved either toward or away from each other depending on the coupling arrangement. A stop ring for a hole and a stop ring for a shaft can be fitted in a hole and a groove formed on the surface of a shaft respectively by using the pliers according to this invention.

This invention relates to pliers for fitting a stop ring.

Generally, a stop ring for a hole and a stop ring for a shaft are secured in position by being fitted in a groove formed in a hole and a groove formed on the peripheral surface of a shaft respectively. In the case of a stop ring for a hole, the stop ring has a diameter which is slightly larger than the inner diameter of the hole because it is required to bring the outer diameter into agreement with the dimension of the groove formed in the hole when mounted. On the other hand, the stop ring for the shaft has an inner diameter which is slightly smaller than the outer diameter of the shaft because the inner diameter of the stop ring must be brought into agreement with the groove formed on the peripheral surface of the shaft when mounted. Accordingly, in fitting the stop ring for the hole in the groove formed in the hole, it is required to contract the ring by reducing the diameter of the ring against the resilience of the ring so as to bring it to a level below the inner diameter of the hole. Conversely, in fitting the stop ring for the shaft, the ring must be expanded so as to increase its diameter to more than the diameter of the shaft.

At present, it is usual practice to mount stop rings by using pliers substantially in scissors shape which are exclusively used for mounting stop rings. Forward blade portions are inserted in openings formed in opposite ends of the stop ring respectively and the pliers are opened or closed for varying the diameter of the rings to render the stop rings ready for mounting.

Thus, present practice requires the use of two pliers of different types. The pliers for the stop ring for the hole are constructed such that the forward end portions are closed when the pliers are operated, while the forward end portions of the pliers for the stop ring for the shaft open when the pliers are operated. It has hitherto been customary to have these two pliers of the different types on hand so that the pliers suiting the purpose may be used as desired. However, the use of two pliers of different types has disadvantages. It is uneconomical to use two pliers of substantially similar construction. It is troublesome to carry two pliers about when the operation involves a site of large area, and operation efficiency is naturally reduced.

Accordingly, a principal object of the invention is to provide pliers for mounting a stop ring which can serve concurrently as pliers for a stop ring for a hole and pliers for a stop ring for a shaft.

Another object of the invention is to provide pliers for mounting a top ring which are simple in construction, easy to handle and low in cost, said pliers comprising a mechanism of simple construction for switching the pliers from the hole stop ring use to the shaft stop ring use and vice versa.

According to this invention, there are provided pliers for mounting a stop ring in which two pivotally connected handle members may be coupled with two pivotally connected support members carrying respective ring engaging blades in two arrangements in such a manner that, in one arrangement, the blades move toward each other when the free ends of the handle members are moved toward each other, and in the other arrangement, the blades move away from each other when the free ends of the handle members are moved toward each other.

Additional objects as well as features and advantages of the invention will become evident from the description set forth hereunder when considered in conjunction with the accompanying drawings, in which.

The construction of the pliers according to this invention will be explained with reference to FIGS. 1 and 2. In the figures, 1 and 2 are handles having annular portions 1a and 2a respectively which are pivotally connected to each other at the center of the annular portions 1a and 2a superimposed one on the other. 1b and 2b are lower portions of the handles 1 and 2 respectively. 3 is a pivot rivet for the handles 1 and 2.

Figure 7:
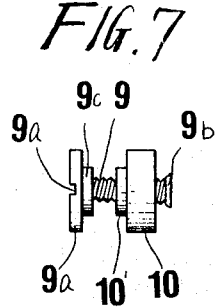
FIG. 7 is a side view of the screw and nut for pivotally connecting the blade support members of the pliers.

4 and 5 are blade support members which are interposed between the annular portions 1a and 2a of the handles 1 and 2. The blade support members 4 and 5 mount at one end portion blades 6 and 7 respectively which are removably connected to the blade support members by screws 8, 8 and formed at the other portion with openings 4a and 5a and openings 4b and 5b (see FIG. 3) in the bent portion and forward end portion respectively of the other end portion. The openings 4a and 5a receive a pivot when the pliers are adapted for use as pliers for shaft stop pins and the openings 4b and 5b receive a pivot when the pliers are adapted for use as pliers for hole stop rings 9 and 10 are a screw and a nut respectively as shown in FIG. 7 which are inserted in the openings 4a and 5a in the bent portion or the openings 4b and 5b in the forward end portion to provide a slip joint. 9a is a screw head formed with a groove 9a' for screw driver and 9b is an upset portion at the tip of the screw for preventing the loss of the nut 10. The screw 9 has an outer diameter to be loosely received in a slot connecting the openings 4a and 4b and a slot connecting the openings 5a and 5b. The screw 9 and nut 10 have pivot portions 9c and 10' respectively which have an outer diameter matching the openings 4a, 5a, 4b and 5b.

Figure 1:
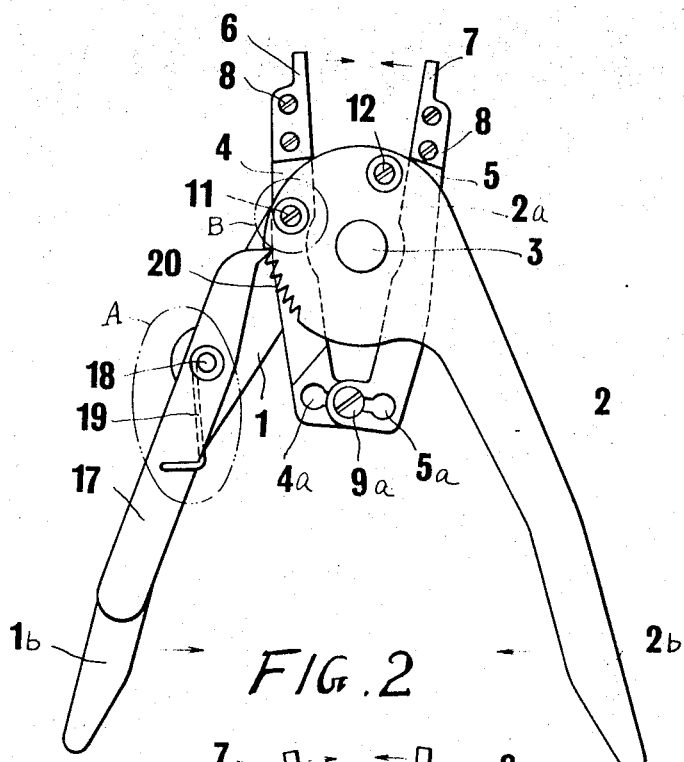
FIG. 1 is a front view of the pliers according to this invention adapted for use with a hole stop ring.
Figure 2:
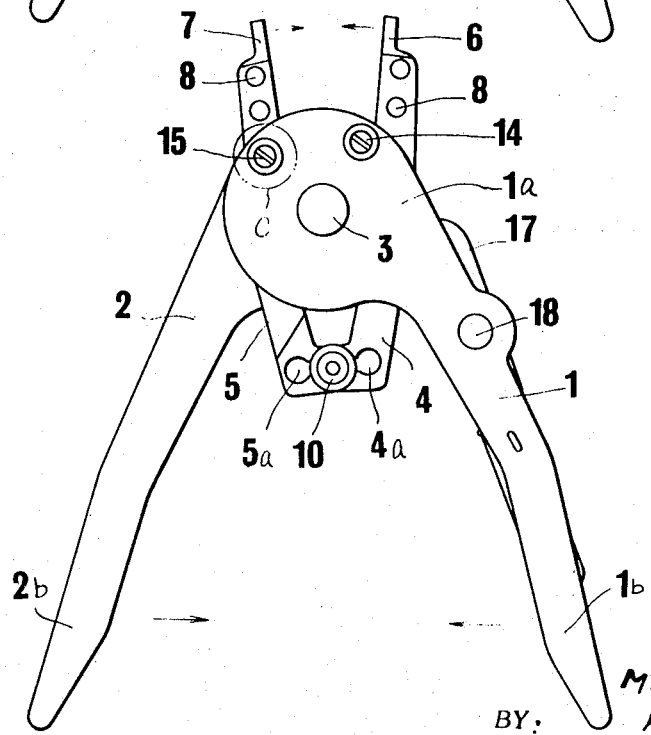
FIG. 2 is a rear view of the pliers of FIG. 1.
Figure 3:
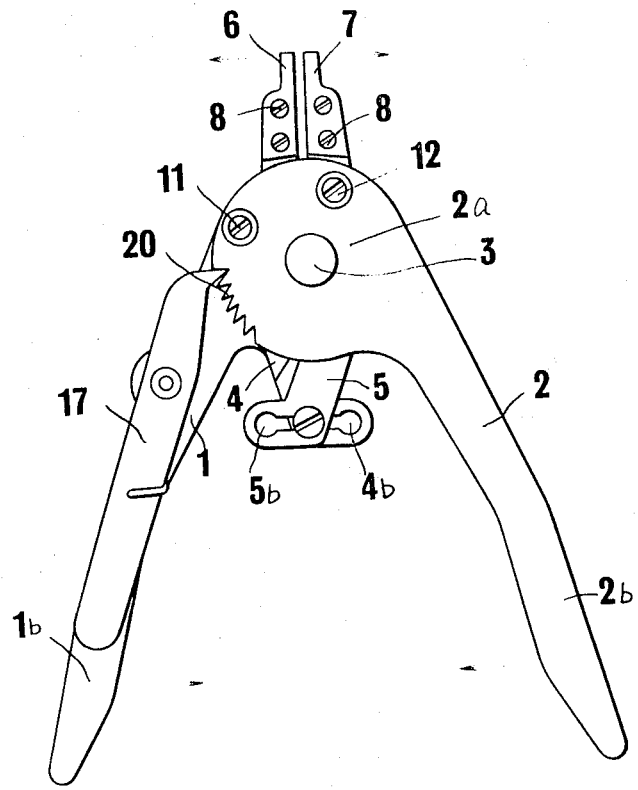
FIG. 3 is a front view of the pliers according to this invention adapted for use with a shaft stop ring.
Figure 5:
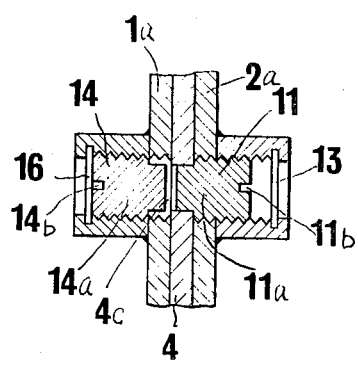
FIG. 5 is an enlarged sectional side view of the portion B of the pliers of FIG. 1.
Figure 6:
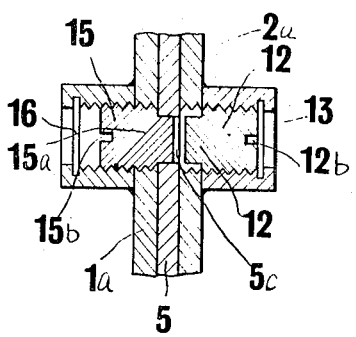
FIG. 6 is an enlarged sectional side view of the portion C of the pliers of FIG. 2.

The pivot portion 9c and 10' of the screw 9 and nut 10 respectively of the pliers shown in FIGS. 1 and 2 are received in the pivot opening 4b and 5b, while they are received in the openings 4a and 5a in FIG. 3. 11 and 12 are screws which are received, as shown in FIGS. 5 and 6, in two internally threaded openings respectively formed in the outer marginal portion of the annular portion 2a of the handle 2. The screws 11 and 12 have smooth coupling pin portions 11a and 12a respectively which are adapted to be inserted in and withdrawn from openings 4c and 5c of the blade support members 4 and 5 respectively. The screws 11 and 12 are formed at their heads with grooves 11b and 12b respectively for receiving a screw driver. 13, 13 are rings fitted in the outer ends of the two internally threaded openings formed in the annular portion 2a for preventing loss of the screws 11 and 12.

14 and 15 are screws which are received, as shown in FIGS. 5 and 6, in two internally threaded openings respectively formed in the outer marginal portion of the annular portion 1a of the handle 1. The screws 14 and 15 have smooth coupling pin portions 14a and 15a respectively which are adapted to be inserted in and withdrawn from the openings 4c and 5c of the blade support members 4 and 5 respectively. The screws 14 and 15 are formed at their heads with grooves 14b and 15b respectively for receiving a screw driver. 16, 16 are rings fitted in the outer ends of the two internally threaded openings formed in the annular portion 1a for preventing loss of the screws 14 and 15.

Figure 4:
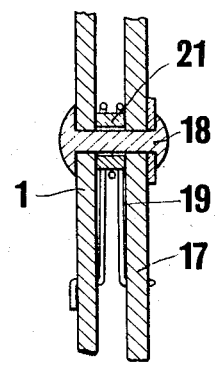
FIG. 4 is an enlarged sectional side view of the portion A of the pliers of FIG. 1.

17 is a pawl lever pivotally connected by a pivot rivet 18 to the intermediate portion of the handle 1 as shown in FIGS. 1 to 4. 19 is a spring for urging the lever 17 into engagement with ratchet teeth 20 formed on the outer periphery of the annular portion 2a of the handle 2. The spring 19 urges the tip of the lever 17 into engagement with the ratchet teeth 20. The degree of opening of the blades 6 and 7 can be varied depending on the position at which the tip of the lever 17 comes into engagement with the teeth 20. 21 shown in FIG. 4 is a spacer.

Figure 9:
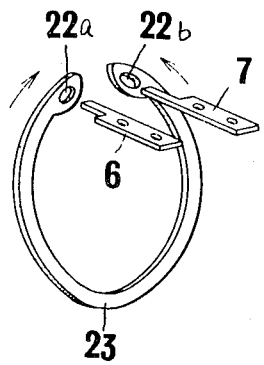
FIG. 9 is a perspecive view of a stop ring for a hole and the corresponding blades of the pliers.

The operation of the pliers according to this invention will now be explained. First, the description will refer to the operation of mounting a hole stop ring 22 as shown in FIG. 9. As stated previously, it is required to contract a hole stop ring so as to reduce its outer diameter to less than the diameter of the hole. To this end, the screw 14 is withdrawn by means of a screw driver so as to release the pin portion 14a from the opening 4c in the blade support member 4 as shown in FIG. 5. Then, the screw 11 is inserted in the opening 4c by means of a screw driver. In the same manner, the screw 12 is withdrawn from the opening 5c in the blade support member 5 as shown in FIG. 6, and the screw 15 is inserted in the opening 5c. Thereafter, the nut 10 is loosened and the screw 9 is moved to the pivot openings 4b and 5b as shown in FIG. 1, the nut 10 being tightened again so that the screw 9 in the openings 4b and 5b may act as a pivot for the two blade support members 4 and 5.

Then, the lever 17 is pivotally moved against the biasing force of the spring 19 to release its tip from engagement with the teeth 20, and the lower handle portions 1b and 2b pivoted at 3 are moved to bring the tip of the lever 17 into engagement with the uppermost tooth of the teeth 20 as shown in FIG. 1 (the lower handle portions 1b and 2b are spaced apart from each other the greatest distance at this time). This brings the spacing between the blades 6 and 7 into agreement with the spacing between openings 22a and 22b formed in the hole stop ring 22 as shown in FIG. 9.

After the blades 6 and 7 are inserted in the openings 22a and 22b in the hole stop ring 22 respectively, the lower handle portions 1b and 2b are moved toward each other as shown by the arrows in FIG. 1. With the annular portions 1a and 2a of the handles 1 and 2 respectively being firmly connected to the blades support members 4 and 5 by the screws 15 and 11 respectively, the movement of the lower handle portions 1b and 2b toward each other results in the movement of the blade support members 4 and 5 toward each other since the members 4 and 5 are pivotally connected to each other at 9. This causes the blades 6 and 7 also to move toward each other as shown by the arrows in FIG. 1 to thereby reduce the spacing between them, so that the spacing between the ends of the stop ring 22 is reduced and the stop ring 22 is ready for insertion in a hole.

The stop ring 22 in this state is inserted in the hole and the outer periphery of the hole stop ring is fitted accurately in the groove formed in the hole. Then, the lever 17 is released from the teeth 20 against the biasing force of the spring 19. Thereafter, the force exerted on the lower handle portions 1b and 2b is released. Thus, the hole stop ring 22 is fitted in position in the groove. After the stop ring 22 is accurately mounted in the hole, the blades 6 and 7 of the pliers are withdrawn from the openings 22a and 22b to complete the operation.

Figure 8:
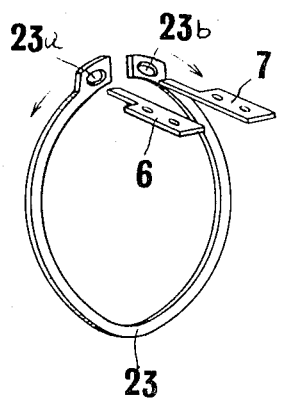
FIG. 8 is a perspective view of a stop ring for a shaft and the corresponding blades of the pliers.

Now, the operation of the pliers according to this invention will be explained with reference to FIG. 8 which shows a shaft stop ring 23 to be mounted in a groove formed on the outer priphery of a shaft. As aforesaid, the shaft stop ring 23 must be expanded so as to increase its diameter to more than the outer diameter of the shaft before mounting. In this case, the screw 11 is withdrawn so as to release the pin portion 11a from the opening 4c in the blade support member 4 and the screw 14 is inserted in the opening 4c. The screw 15 is withdrawn from the opening 5c, and the screw 12 is inserted in the opening 5c. Then, the nut 10 is loosened and the screw 9 is moved to the pivot openings 4a and 5a as shown in FIG. 3, the nut 10 being tightened again so that the screw 9 in the openings 4a and 5a may act as a pivot for the two blade members 4 and 5.

Then, the lever 17 is pivotally moved against the biasing force of the spring 19 to release its tip from engagement with the teeth 20, and the lower handle portions 1b and 2b pivoted at 3 are moved to bring the tip of the lever 17 into engagement with the uppermost tooth 20 as shown in FIG. 3 (the lower handle portions 1b and 2b are spaced apart from each other the greatest distance at this time). This brings the spacing between the blades 6 and 7 into agreement with the spacing between openings 23a and 23b formed in the shaft stop ring 23 as shown in FIG. 8.

After the blades 6 and 7 are inserted in the openings 23a and 23b in the shaft stop ring 23 respectively, the lower handle portions 1b and 2b are moved toward each other as shown by the arrows in FIG. 3. With the annular portions 1a and 2a of the handles 1 and 2 respectively being firmly connected to the blade support members 4 and 5 by the screws 12 and 14 respectively, the movement of the lower handle portions 1b and 2b toward each other results in the movement of the blade support members 4 and 5 away from each other since the members 4 and 5 are pivotally connected to each other at 9. This causes the blades 6 and 7 also to move away from each other as shown by the arrows in FIG. 3 to thereby increase the spacing between the ends of the shaft stop ring 23 is increased and the diameter of the stop ring is increased to more than the outer diameter of the shaft for which the stop ring is intended.

The stop ring 23 in this state is slipped over the shaft, and aligned with the groove in the shaft. Then, the lever 17 is released from the teeth 20, and the force exerted on the lower handle portions 1b and 2b is released. Thus, the shaft stop ring 23 is fitted in the groove in the shaft, and the blades 6 and 7 of the pliers are withdrawn from the openings 23a and 23b to complete the operation.

In the embodiment described hereinabove, the pivot openings 4a and 5a for adapting the pliers for use with shaft stop rings and the pivot openings 4b and 5b for adapting the pliers for use with hole stop rings are formed in different portions of the blade support members 4 and 5 respectively.

Alternatively, the blade support members 4 and 5 may be pivotally connected in one position only. In this form of the invention, it is required to bring the spacing between the blades 6 and 7 into agreement with the spacing between the openings 22a and 22b in the hole stop ring 22 or the spacing between the openings 23a and 23b in the shaft stop ring 23 by pivotally moving the lower handle portions 1b and 2b while the lever 17 is released from engagement with the teeth 20.

The use of the lever 17 and ratchet teeth 20 for controlling the pivotal movement of the lever in one direction permits to maintain the spacing between the blades at any value as desired. However, this arrangement is not essential, of course, and some other arrangement may be used within the scope of the invention.

From the foregoing description, it will be appreciated that the pliers according to this invention offer many advantages. Some of them are stated hereinafter.

First, the pliers according to this invention are versatile because they can be adapted either for use with hole stop rings or for use with shaft stop rings merely by manipulating screws.

Secondly, the pliers according to this invention are simple in construction, easy to handle and low in cost. The pliers merely comprise two handles, two blade support members each mounting a blade, and some screws.

While a particular embodiment of this invention has been shown and described, it will be understood, of course, that the description of the embodiment is by way of illustration only and that the invention is not to be limited thereto, since many substitutions, modifications and changes may be made therein by one having the ordinary skill in the art without departing from the spirit and scope of the invention defined in the claims.

What I claim is:

1. Pliers comprising, in combination:
   (a) two handle members having each a first portion pivotally connected to the first portion of the other handle member and a second free end portion movable toward and away from the second portion of the other handle member;
   (b) two blade support members having each a first portion pivotally connected to the first portion of the other blade support member and a second portion movable toward and away from the other blade support member;
   (c) a ring engaging blade member on each of said second portions of said blade support members; and
   (d) coupling means on each handle member for alternatively coupling said handle members to said blade support members in two arrangements,
      (1) in one of said arrangements, one of said handle members being coupled to one of said blade support members, and the other handle member being coupled to the other blade support member for movement of said blade members toward each other when said free end portions are moved toward each other,
      (2) in the other arrangement, said one handle member being coupled to said other blade support member, and said other handle member being coupled to said one blade support member for movement of said blade members away from each other when said free end portions are moved toward each other.

2. Pliers as set forth in claim 1, further comprising first pivot means connecting said first portions of said handle members for movement about a first pivot axis, respective parts of said blade support members being axially interposed between said first portions of said handle members, said coupling means including two coupling members movable on the first portion of each handle member toward and away from positions of coupling engagement with said parts of said blade support members respectively, and second pivot means connecting said first portions of said blade support members for movement about a second pivot axis spaced from said first pivot axis, said pivot axis extending in a common direction and being spaced from said coupling members.

3. Pliers as set forth in claim 2, wherein said coupling members are threadedly mounted on the respective handle members for threaded movement toward and away from said positions thereof, said parts of said blade support members being formed with respective openings arranged for engagement by said coupling members.

4. Pliers as set forth in claim 3, wherein said blade support members are each formed with a single opening arranged for alternative engagement by two coupling members mounted on said handle members respectively.

5. Pliers as set forth in claim 2, wherein said coupling members pivotally engage said blade support members, and said second pivot means include a pivot pin, said first portions of said blade support members being formed respective slots receiving said pivot pin for movement of said pivot pin radially relative to said second pivot axis, and securing means for securing the position of said pivot pin in each of said slots, and for thereby securing the position of said pivot axis relative to said blade support members.

6. Pliers as set forth in claim, wherein said blade support members are elongated, said part of each blade support member being longitudinally interposed between the first and second portions of said blade support member.

7. Pliers as set forth in claim 1, further comprising releasable pawl-and-ratchet means interposed between said handle members for securing said free end portions in each of a plurality of relative positions.

References Cited

UNITED STATES PATENTS

| | | | |
|---|---|---|---|
| 1,426,553 | 8/1922 | Cruickshank | 81—341 UX |
| 2,546,616 | 3/1951 | Schaaff | 81—302 X |

ROBERT C. RIORDON, Primary Examiner

R. V. PARKER, Jr., Assistant Examiner

U.S. Cl. X.R.

81—302, 341